Patented Feb. 16, 1926.

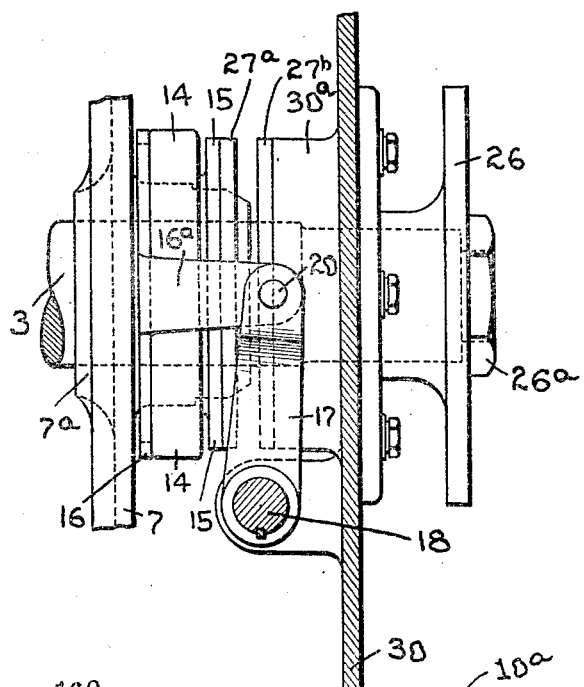
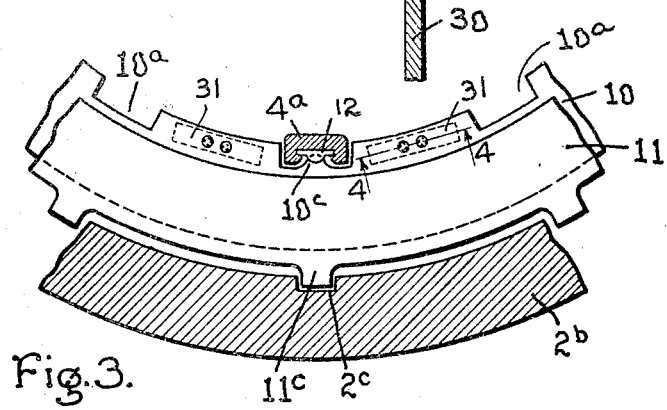
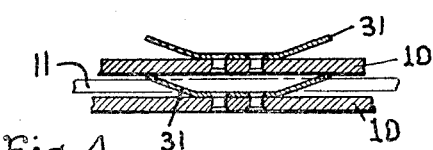

1,573,217

UNITED STATES PATENT OFFICE.

JOSEPH R. ZETWO, JR., OF PITTSBURGH, PENNSYLVANIA.

FRICTION CLUTCH.

Application filed March 21, 1925. Serial No. 17,206.

*To all whom it may concern:*

Be it known that I, JOSEPH R. ZETWO, Jr., a citizen of the United States, residing at Pittsburgh, in the county of Allegheny and State of Pennsylvania, have invented certain new and useful Improvements in Friction Clutches; and I hereby declare that the following is a full, clear, and exact description thereof, reference being had to the accompanying drawings, which form part of this specification.

This invention is an improvement in oil lubricated clutches, designed particularly for use in automobile transmission mechanisms, but susceptible of other usese in the art, and the object of the invention is to provide an efficient clutch which will be reliable in operation, non-dragging, non-grabbing, non-slipping, self-cleaning, and self-lubricating.

In the accompanying drawings I have illustrated one practical form of clutch embodying the invention, and I will describe the same with reference to said drawing, to enable others skilled in the art to adopt and use the same, and in the claims following the description I have summarized the essentials of the invention, the novel features of construction, and novel combinations of parts for which protection is desired.

In the drawings:

Fig. 2 is a detail section on the line 2—2 Fig. 1.

Fig. 3 is a detail section on the line 3—3 Fig. 1.

Fig. 4 is an enlarged detail section on line 4—4 Fig. 3.

Figure 1:
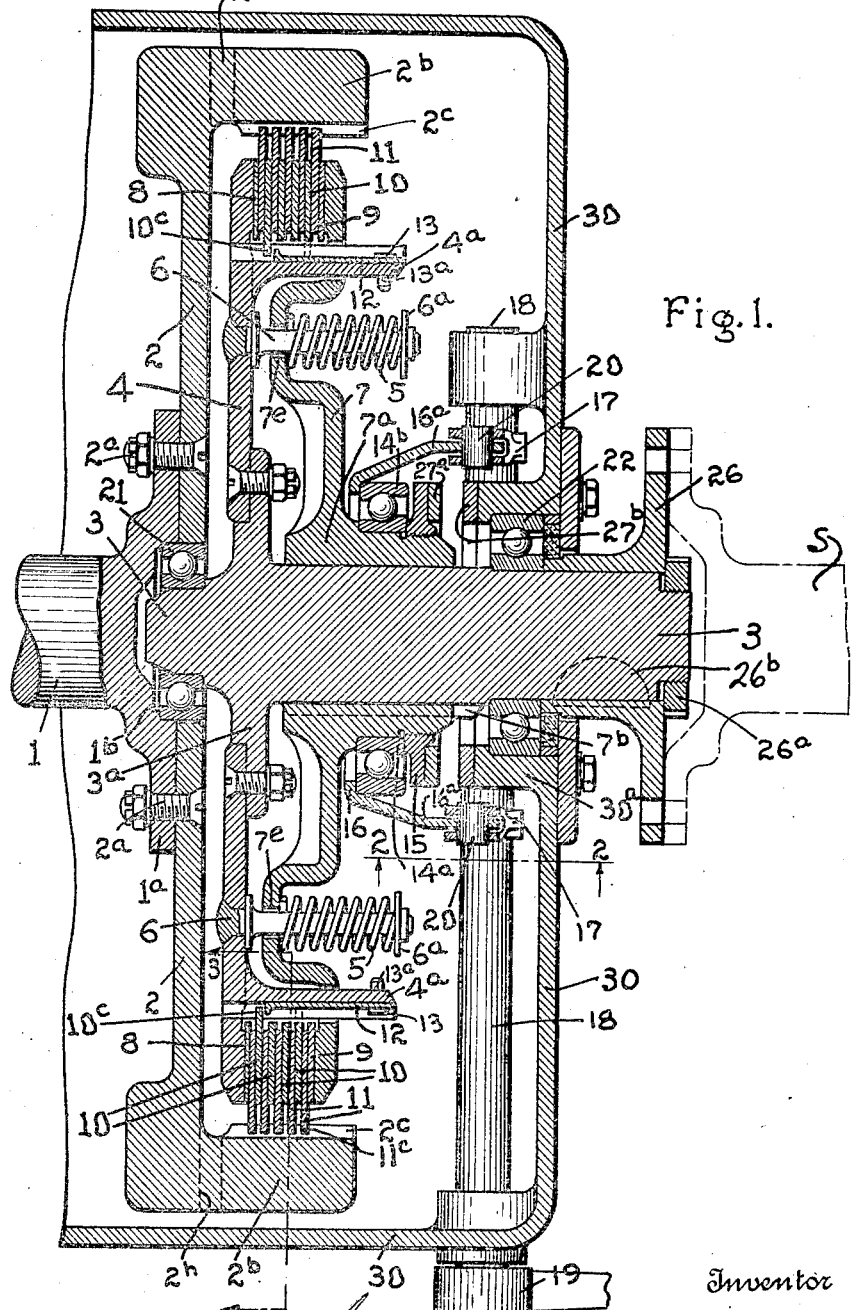
Fig. 1 is a longitudinal section through the complete clutch.

As shown in the drawings, the driving shaft 1 is provided with a flange $1^a$ to which is attached a fly wheel 2 by means of bolts $2^a$ or other suitable means. The fly wheel is provided with a rim $2^b$ within which are assembled friction clutch rings 8, 9, 10, and 11 hereinafter referred to, rings 11 being the driving rings and are provided with peripheral lugs $11^c$, as shown in Fig. 3, which engage longitudinal grooves $2^c$ in the inner periphery of the fly wheel rim $2^b$, so as to cause the driving rings 11 to rotate with the fly wheel.

In the rim $2^b$ of fly wheel 2, adjacent the forward end thereof are provided a number of radial holes $2^h$, through which any dirt or sediment which might otherwise lodge in the rim is discharged.

In axial alinement with the shaft 1, is a clutch shaft 3, one end of whch is journaled in a ball bearing 21, supported in an annular recess $1^b$ in the flange $1^a$, its other end being journaled in a ball bearing 22, supported in an annular projection $30^a$ of the clutch housing 30, as shown in Fig. 1. The housing 30 may be of any suitable construction to enclose the working parts of the clutch, and is preferably filled with lubricating oil, and hence should be oil-tight, and should be rigidly supported relative to the shaft 1 so that bearings 21 and 22 are in axial alinement therewith.

Shaft 3 is provided with a flange $3^a$ adjacent the bearing 21, to which flange is bolted or otherwise attached a spider 4, having twelve fingers $4^a$, integral therewith, said fingers projecting parallel with shaft 3, and being spaced apart 30° center to center, and disposed on a pitch circle of somewhat less diameter than the diameter of the inner periphery of the rings 10.

Opposite the spider 4 is a disk 7 with a hub $7^a$ which is slidably mounted on the shaft 3, but splined thereto, as at $7^b$, so that disk 7 must rotate with shaft 3 but can move longitudinally along said shaft.

Disk 7 and spider plate 4 are normally yieldingly drawn toward each other by suitable springs. As shown, a plurality of springs 5 are mounted on bolts 6, which are riveted to the spider 4, said bolts being disposed on a pitch circle of somewhat less diameter than that of the spider fingers $4^a$. Bolts 6 project through holes $7^c$ in disk 7, and the springs 5 are interposed between washers $6^a$ on the outer ends of bolts 6 and the outer face of the disk 7, as shown in Fig. 1.

A plain friction ring 8 is attached to the inner face of the spider 4 near the periphery thereof and exterior to the fingers $4^a$, and attached to the opposed face of the disk 7, opposite ring 8 is a plain friction ring 9. Between the rings 8 and 9 are arranged a plurality of parallel and alternating friction rings 10 and 11, the rings 10 (four being shown) being the driven rings, and the rings 11 (five being shown) being the driving rings, said rings 11 being locked to the rim $2^b$ of the fly wheel 2, as above explained.

To insure proper separation of the driven and driving rings when the disk 7 is drawn away from the spider 4, through the operation of the clutch lever 19, hereinafter explained, a series of separating springs 31 are riveted or otherwise securely attached to the rings 10, as shown in Figs. 3 and 4. Preferably each ring 10 is provided with six such springs 31, one spring 31 being preferably disposed at each side of lugs 10$^c$. As shown in Fig. 3, the springs 31 are preferably attached to the rings 10 at points within the interior diameter of rings 11, so as not to contact with rings 11, said springs acting to separate the driven rings 10 as shown in Fig. 4 when the clutch is "out", thereby forcing the driven rings 10 from the driving rings 11.

When the clutch is "in", springs 5 normally draw plate 4 and disk 7 together thereby pressing the friction rings 8, 9, 10, and 11 together, the friction therebetween causing the shaft 3 to rotate with the shaft 1.

In order to prevent the driven rings 10 from separating too far when the clutch is "out", rings 10 are provided with lugs 10$^c$, 3 per ring spaced 120 degrees apart see Fig. 3, on their inner peripheries, which lugs project into grooves in the outer sides of the spider fingers 4$^a$ and contact with stop bars 12, attached to the outer sides of fingers 4$^a$, to limit the movement of the driven rings 10 when the clutch is "out". Thus, when the clutch is "out" or disengaged lugs 10$^c$ contact with the front ends of their related stop bars 12 and each driven disc 10 is limited in its axial movement along shaft 3 by and according to the setting of the related stop bars 12, the stop bars 12 being set so as to engage the lugs 10$^c$ on the several driven rings 10 when the clutch is "out", and to provide ample clearance between the friction surfaces.

Preferably three such bars 12 are used for each driven ring 10, and spaced 120° apart, center to center. Since there are four driven rings 10, and twelve spider fingers 4$^a$ and each ring 10 requires three stop bars 12, there must be four sets of stop bars, of different lengths. These stop bars 12 are preferably secured to the fingers 4$^a$ by means of pins 13 tapped through the stop bars and the fingers 4$^a$, said pins 13 being locked in place by means of cotter pins 13$^a$, as shown in Fig. 1.

The friction rings 10, as shown, are of less internal diameter than the driving rings 11, and each ring 10 is provided with notches 10$^a$ in its inner periphery (see Fig. 4) to engage the spider fingers 4$^a$, so that when the rings 10 are engaged with the driving rings 11 the spider 4 and shaft 3 will be caused to rotate therewith.

On the hub 7$^a$ is screwed an annular ring 15 which confines one member 14$^a$ of a ball thrust bearing to said hub, and the other member 14$^b$ of said ball thrust bearing is engaged by a collar or ring 16 which is provided with two diametrically opposite arms 16$^a$ pivotally connected by pins 20 (see Figs. 1 and 2) to forked levers 17 keyed on a rock shaft 18 journaled in bearings in the casing 30, said shaft 18 being provided with an operating lever 19 exterior to the casing 30. Thus by rocking the shaft 18 the disk 7 will be moved axially away from the spider 4 against the action of springs 5 to disengage or separate the friction rings 8, 9, 10, and 11, and the shaft 3 will cease to rotate with the shaft 1.

Shaft 3 preferably projects outside the housing 30, and keyed or otherwise securely attached to the projecting end thereof is a coupling flange 26 which may be secured to the shaft 3 by a key 26$^b$ and nut 26$^a$, and to this flange may be bolted the driven shaft (indicated at S) to be operated through the clutch from the driving shaft 1.

When the clutch is "out" or disengaged, the rings 8, 9, 10, and 11 are separated by the action of the springs 31 on the driven rings 10 contacting against the faces of the adjacent rings 10. Rings 8 and 9 need not be provided with springs 31, but are preferably the ordinary type of plain friction rings, the same being attached to the opposed faces of spider 4, and the disk 7 respectively.

Rings 10 are permitted to travel in separating until there is approximately $\frac{1}{32}''$ clearance between all friction surfaces, their travel being limited, as above explained by contact of the lugs 10$^c$ thereof with their related stop bars 12, on the spider fingers 4$^a$.

In assembling the clutch, blank rings of $\frac{1}{32}''$ thickness are placed between the friction rings to provide for accurate clearance between all friction surfaces, and the several sets of stop bars 12 are adjusted in their keyways in the spider fingers 4$^a$ until they just touch the lugs 10$^c$ on their related driven rings 10. Then the bars are fastened in place. Each finger and stop bar is then preferably stamped or numbered for identification. The clutch may then be dismantled, the blank discs removed and the parts reassembled, leaving the desired clearance.

In oil clutches heretofore designed, dragging has been a very common disadvantage, being produced by the springs which separated the rings when the clutch was disengaged forcing said rings so far in the opposite direction that the rings would contact with other rings, and produce clutch action by friction between the rings. In my clutch this objection is eliminated since the rings, when the clutch is disengaged, can separate only far enough to permit a clearance of say $\frac{1}{32}''$ between all frictional surfaces of the rings, and the stop bars limiting the movement of the discs and preventing over separation thereof.

To prevent turning of the shaft 3 when the clutch is "out" and the shaft 1 is itself rotating a clutch brake is provided, adapted to act only when said clutch is entirely disengaged, as shown in Figs. 1 and 2, this clutch brake comprising two friction rings 27$^a$ and 27$^b$ of equal size both concentric with the shaft 3. Ring 27$^a$ is securely riveted or screwed to the rear face of the bearing retaining nut 15, and ring 27$^b$ is riveted or screwed to the adjacent portion of the annular lug 30$^a$ of clutch housing 30, said rings being separated a distance slightly less than the working travel of the clutch, so that when the clutch is entirely disengaged, said friction rings 27$^a$, 27$^b$ will contact and prevent rotation of the shaft 3.

My novel clutch is non-dragging, and when the clutch is "out" there is no tendency of the friction rings to drag or hang together and cause the driven shaft 3 to continue revolving with the driving shaft 1. For the same reason, the clutch is non-grabbing, that is, as the clutch engages, the springs 31 compress and the lubricated rings gradually pick up the power. The clutch is also non-slipping, for ample frictional surface is provided so that when the clutch is fully engaged no slipping can take place.

The clutch also is self-cleaning, as any sediment which may work behind the friction rings is washed out through the holes 2$^h$ provided in the fly wheel rim 2$^b$. As the oil is forced from between the friction rings it carries with it any grit or sediment, and passes through the holes 2$^h$ by the action of centrifugal force.

The clutch is also self-adjusting, since any wear that may take place from excessive slipping of the clutch is taken care of by the springs 5. As the clutch runs in a bath of light oil, it is self-lubricating.

The brake is efficient and effective, and needs no adjusting as the wear on all the rings together would not be 1/8" after many years of service.

What I claim is:

1. In a friction clutch, a spider having a series of fingers; a plurality of friction rings axially movably mounted on said spider; each said finger having a longitudinally disposed groove therein; and a stop bar in the groove of each finger adapted to engage a ring when the clutch is "out."

2. In a friction clutch, a spider having a series of fingers evenly spaced; a plurality of friction rings axially movably mounted on the spider exterior to the fingers, each finger having a longitudinally disposed groove therein; and a stop bar in the groove of each said finger adapted to engage its related ring when the clutch is "out."

3. In a friction clutch, a spider having a series of longitudinally grooved fingers; a plurality of axially movable friction rings on the spider exterior to the fingers, said rings having notches engaging the said fingers to cause them to rotate with the spider, and having lugs engaging the grooves in said fingers; and stop bars connected to said fingers adapted to engage the lugs, when the clutch is "out."

4. In a friction clutch, a spider having a series of longitudinally grooved fingers; a plurality of axially movable friction rings on the spider exterior to the fingers, said rings having notches engaging the said fingers to cause them to rotate with the spider, and having lugs entering the grooves in said fingers; and stop bars mounted in the grooves of said fingers and adapted to engage the lugs when the clutch is "out."

5. In a friction clutch, a spider having a series of longitudinally grooved fingers; an opposed plate; a plurality of friction rings interposed between the spider and plate exterior to the fingers; some of the rings having notches engaging the said fingers to cause them to rotate with the spider, and having lugs engaging the grooves in said fingers; and stop bars connected to said fingers and adapted to engage the lugs.

6. In a friction clutch, a spider having a series of longitudinally grooved fingers; an opposed plate; a plurality of driving and driven friction rings interposed between the spider and plate exterior to the fingers; the driven rings having notches engaging the said fingers to cause them to rotate with the spider, and having lugs in said notches entering the grooves in said fingers; and stop bars mounted in the grooves and adapted to engage the lugs when the clutch is "out."

7. In a friction clutch, a spider having a series of longitudinally grooved fingers, an opposed plate; a plurality of driving and driven friction rings interposed between the spider and plate exterior to the fingers; the driven rings having notches engaging the said fingers to cause them to rotate with the spider, and having lugs in said notches engaging the grooves in said fingers; separating springs interposed between adjacent driven rings at points clear of the inner periphery of the driving rings; and stop bars mounted in the grooves of said fingers and adapted to engage the lugs.

8. In a clutch, a driving member; a driven shaft; a spider having a series of longitudinally grooved fingers mounted on the driven shaft; a plate opposite said spider slidably mounted on said driven shaft; means for yieldingly forcing the spider and plate together; a plurality of driving and driven friction rings interposed between the spider and plate, the driving rings being operatively connected with the driving member so as to rotate therewith, and the driven rings having notches engaging the fingers to cause the spider to rotate therewith, and having lugs in the notches entering the grooves in the fingers; means for moving the plate away from the spider so as to permit the friction rings to separate; and means on the fingers for limiting the relative separating movements of the driven rings.

9. In mechanism as set forth in claim 8, the means for limiting the separating movement of the driven rings comprising stop bars mounted in the grooves of said fingers and adapted to engage the lugs in the notches of the driven rings when the clutch is "out", and means for locking the stop bars in adjusted position.

10. In a clutch, a driving member connected therewith; a driven shaft; a spider having a series of longitudinally grooved fingers mounted on the driven shaft; a plate opposite said spider slidably mounted on said driven shaft; means for yieldingly forcing the spider member and plate toward each other; a plurality of driving and driven friction rings interposed between the spider and plate, the driving rings being operatively connected with the driving member so as to rotate therewith, and the driven rings being operatively connected with the spider to cause the latter to turn therewith; means for moving the plate away from the spider so as to permit the friction rings to disengage; lugs on the driven rings entering the grooves in the fingers; and a plurality of stop bars mounted in the grooves of said fingers and adapted to engage the lugs on the driven rings, and means for locking the stop bars in adjusted position.

11. In a clutch, a driving shaft, a driving member connected therewith; a driven shaft in axial alinement with the driving shaft; a spider having a series of longitudinally grooved fingers mounted on the driven shaft; a plate opposite said spider slidably mounted on said driven shaft; spring means for forcing the spider member and plate yieldingly toward each other; a plurality of driving and driven friction rings interposed between the opposed faces of the spider and plate, the driving rings being operatively connected with the driving member so as to rotate therewith, and the driven rings being operatively connected with the spider to cause the latter to turn therewith; means for moving the plate away from the spider so as to permit the friction rings to disengage; springs interposed between the driven friction rings to cause the latter to separate when the plate is moved away from the spider; and a plurality of stop bars for limiting the relative separating movement of each driven ring when the plate is moved away from the spider; said bars being mounted on the fingers of the spider member; and means for locking each stop bar in adjusted position.

In testimony that I claim the foregoing as my own, I affix my signature.

JOSEPH R. ZETWO, Jr.